US010841390B2

(12) United States Patent
Chen et al.

(10) Patent No.: US 10,841,390 B2
(45) Date of Patent: Nov. 17, 2020

(54) METHOD AND SYSTEM FOR SYNCHRONIZING PUBLICATION AND SUBSCRIPTION OF MESSAGE QUEUES

(71) Applicant: INDUSTRIAL TECHNOLOGY RESEARCH INSTITUTE, Hsinchu (TW)

(72) Inventors: Yu-Lun Chen, Hsinchu (TW); Hung-Wei Lin, Hsinchu (TW); Li-Ting Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/385,041

(22) Filed: Apr. 16, 2019

(65) Prior Publication Data

US 2020/0169616 A1    May 28, 2020

(30) Foreign Application Priority Data

Nov. 22, 2018  (TW) .............................. 107141663 A

(51) Int. Cl.
*H04L 12/00* (2006.01)
*H04L 29/08* (2006.01)
*H04L 12/24* (2006.01)

(52) U.S. Cl.
CPC .......... *H04L 67/26* (2013.01); *H04L 41/5054* (2013.01); *H04L 67/1095* (2013.01); *H04L 67/2809* (2013.01)

(58) Field of Classification Search
CPC ........ G06F 11/1443; G06F 16/27; G06F 9/52; G06F 16/273; H04L 12/66; H04L 47/19; H04L 51/00; H04L 29/06; H04L 67/2823
(Continued)

(56) References Cited

U.S. PATENT DOCUMENTS 5,555,396 A * 9/1996 Alferness ............... G06F 9/546
                                                     710/54
6,029,204 A * 2/2000 Arimilli .................. G06F 9/52
                                                     709/200
(Continued)

FOREIGN PATENT DOCUMENTS

CN         101133380        2/2008
CN         100565474       12/2009
(Continued)

OTHER PUBLICATIONS

Carzaniga, et al. "Achieving Scalability and Expressiveness in an Internet-Scale Event Notification Service", In Nineteenth ACM Symposium on Principles of Distributed Computing (PODC2000); 2000.
(Continued)

*Primary Examiner* — Frantz Coby
(74) *Attorney, Agent, or Firm* — Amin, Turocy & Watson, LLP

(57) ABSTRACT

A system and method for synchronizing publication and subscription of message queues are provided. The method includes: providing a message broker cluster including a plurality of message brokers each having a buffer queue and a data queue; as any one of the message brokers requests a synchronization requirement, selecting, by an orchestration server, one of the message brokers in the message broker cluster to perform data synchronization; setting a data read-lock to the data queue of the selected message broker sequentially to write data contents in the buffer queues of all of the plurality of message brokers into the data queue of the selected message broker; and copying the complete data contents in the data queue of the selected message broker to the data queues of the other message brokers, allowing the
(Continued)

data contents in the data queues of each of the message brokers to be consistent.

13 Claims, 16 Drawing Sheets

(58) Field of Classification Search
USPC ......... 709/248, 205, 206; 707/610, 613, 769
See application file for complete search history.

(56) References Cited

U.S. PATENT DOCUMENTS

| | | | |
|---|---|---|---|
| 6,779,002 B1* | 8/2004 | Mwaura | G06F 16/27 |
| 7,249,229 B2* | 7/2007 | Ogasawara | G06F 3/0613 |
| | | | 709/206 |
| 7,774,356 B2* | 8/2010 | Cui | G06F 9/52 |
| | | | 707/769 |
| 7,865,684 B2* | 1/2011 | Michaylov | G06F 9/526 |
| | | | 711/168 |
| 7,899,783 B1 | 3/2011 | Xu et al. | |
| 7,899,907 B2* | 3/2011 | Tse | H04L 67/2823 |
| | | | 370/229 |
| 8,139,596 B2* | 3/2012 | Gale | H04L 47/19 |
| | | | 370/230.1 |
| 8,191,078 B1* | 5/2012 | Cullen | G06F 11/1443 |
| | | | 707/610 |
| 8,738,704 B2* | 5/2014 | Stark | H04L 12/66 |
| | | | 709/205 |
| 8,954,504 B2* | 2/2015 | Banks | H04L 51/00 |
| | | | 709/204 |
| 9,166,941 B2* | 10/2015 | Glickstein | H04L 67/325 |
| 9,654,571 B2 | 5/2017 | Horton | |
| 9,667,681 B1 | 5/2017 | Milyakov | |
| 9,680,761 B2* | 6/2017 | Abbott | H04L 47/624 |
| 2002/0165903 A1 | 11/2002 | Zargham et al. | |
| 2003/0135556 A1* | 7/2003 | Holdsworth | H04L 29/06 |
| | | | 709/206 |
| 2006/0190243 A1 | 8/2006 | Barkai et al. | |
| 2007/0064703 A1 | 3/2007 | Hernandez et al. | |
| 2008/0133541 A1 | 6/2008 | Fletcher et al. | |
| 2011/0087632 A1* | 4/2011 | Subramanian | G06F 16/273 |
| | | | 707/610 |
| 2012/0079044 A1 | 3/2012 | Dunn | |
| 2014/0330779 A1* | 11/2014 | Koneru | G06F 16/27 |
| | | | 707/613 |
| 2015/0254320 A1 | 9/2015 | Cowling | |
| 2017/0005817 A1* | 1/2017 | Gould | H04L 12/2825 |

FOREIGN PATENT DOCUMENTS

| | | |
|---|---|---|
| CN | 103404087 | 11/2013 |
| CN | 104092767 | 10/2014 |
| CN | 105656959 | 6/2016 |
| CN | 106815354 | 6/2017 |
| TW | M432075 | 6/2012 |
| TW | I376127 | 11/2012 |
| WO | WO-2016089787 A1 * 6/2016 | ............ H04L 51/00 |

OTHER PUBLICATIONS

Salvan "A quick message queue benchmark: Active MQ, RabbitMQ, HornetQ, QPID, ApolloaAS", online: http://bit.ly/1b1UGTa; Apr. 2013.

Eugster, et al. "The Many Faces of Publish/Subscribe", ACM Computing Surveys (CSUR); Jun. 200; 114-131.

Aguilera, et al. "Matching Events in a Content-based Subscription System", In Proceedings of the Eighteenth ACM Symposium on Principles of Distributed Computing (PODC 99, Atlanta, GA) ACM Press; 1999; 53, 61.

Banavar, et al. "An Efficient Multicast Protocol for Content-Based Publish-Subscribe Systems", 1999.

Rostanski, et al. "Evaluation of highly available and fault-tolerant middleware clustered architectures using RabbitMQ", Computer Science and Information Systems; 2014; 879, 884.

Dobbelaere, et al. "Kafka versus RabbitMQ", ResearchGate, https://www.researchgate.net/publication/319463829, Sep. 2017.

Taiwanese Office Action for Taiwanese Patent Application No. 107141663 dated Jul. 2, 2019.

* cited by examiner

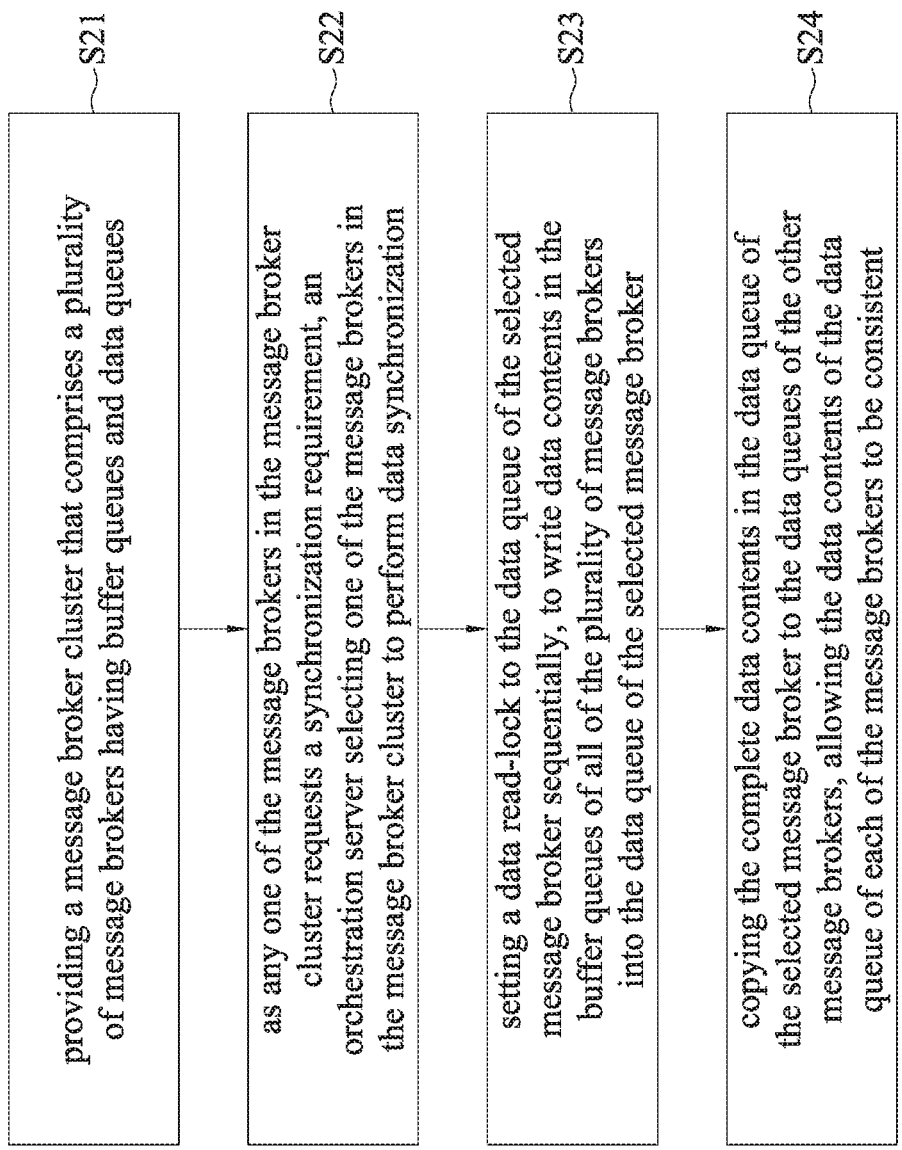

METHOD AND SYSTEM FOR SYNCHRONIZING PUBLICATION AND SUBSCRIPTION OF MESSAGE QUEUES

CROSS-REFERENCE TO RELATED APPLICATIONS

This application claims priority to Taiwanese Application Serial No. 107141663, filed on Nov. 22, 2018. The entirety of the above-mentioned patent application is hereby incorporated by reference herein and made a part of this specification.

TECHNICAL FIELD

This disclosure relates to synchronization mechanisms for message queues among brokers, and, more particularly, to a system and a method for synchronizing publication and subscription of message queues.

BACKGROUND

More and more types of data transmission patterns are used among devices, in order to meet the real-time transmission and access objectives of big data. Distributed publish/subscribe (PUB/SUB) techniques are developed to achieve high throughput and low latency of data transmission for ensuring the synchronization among all contents of message queues and consistency that back-end applications access data contents.

According to a distributed message queue data publishing and subscribing mechanism, messages are categorized into classes, publishers publish the messages to a plurality of distributed message brokers in a parallel manner, and subscribers access the distributed data brokers for the messages, in order to achieve high transmission throughput of message data. An orchestration server (Zookeeper) coordinates the distributed message queue data publishing and subscribing mechanism, based on Round Robin, Range or Hash rules. Although high transmission throughput of message data is achieved, the addressing rules of Zookeeper limit the parallelism of data publication and subscribe access. Data publication and subscription may refer to dynamic environment factors, such as a network bandwidth, a brokering state, and the distance among broker and publisher/subscribers, without limiting to the certain brokers, in order to achieve higher transmission throughput of data messages. However, the synchronization of message contents among brokers has to be solved first.

Data distribution service (DDS) is devoted to a brokerless message transmission technique, which, though achieving high throughput of message transmission and low latency of data significantly, does not guarantee the arrival of data contents and consistency of data contents at the subscriber ends. RabbitMQ is devoted to routing rules and a forwarding technique for brokering messages, which, though improving the accuracy of message transmission, does not have a parallel publication and subscription mechanism. Kafka is devoted to a distributed message broker cluster technique and topic partitioning, which, though also achieving high transmission throughput of message data, does not keep data contents synchronization completely among brokers.

Although the existing distributed PUB/SUB message queue system achieves high throughput of data transmission and low latency, data can be published and subscribed via fixed brokers only, which may not improve parallelism of data transmission. If the access of PUB/SUB ends to message queues of message brokers are not limited, the synchronization problem of message queues (MQs) among message brokers has to be considered, in order to ensure the consistency of data contents by data requiring ends process.

It is known from the above that under the existing distributed PUB/SUB message queue system, how to solve the synchronization problem of message queues among message brokers and ensure that each client end accesses the consistent data is becoming an urgent issue in the art.

SUMMARY

The present disclosure provides a method that can achieve high transmission throughput of a distributed PUB/SUB message queue system, to solve the synchronization problem of contents of message queues among message brokers, and ensure that a client end can select the best one from a plurality of brokers to publish and access data under the consideration of a variety of parameters such as network environments, and that data contents that each client end accesses are consistent.

In an embodiment, a method for synchronizing publication and subscription of message queues according to the present disclosure comprises: providing a message broker cluster that includes a plurality of message brokers, each of which has a buffer queue and a data queue; as any one of the message brokers in the message broker cluster requests a synchronization requirement, selecting, by an orchestration server, one of the message brokers in the message broker cluster to perform data synchronization; setting a data read-lock to the data queue of the selected message broker sequentially, to write data contents in the buffer queues of all of the plurality of message brokers into the data queue of the selected message broker; and copying the complete data contents in the data queue of the selected message broker to the data queues of the other message brokers, allowing the data contents in the data queues of each of the message brokers to be consistent.

In another embodiment, a system for synchronizing publication and subscription of message queues according to the present disclosure comprises: a message broker cluster including a plurality of message brokers, each of which has a buffer queue and a data queue; and an orchestration server connected to the message broker cluster, wherein as any one of the message brokers of the message broker cluster requests a synchronization requirement, the orchestration server selects one of the message brokers in the message broker cluster to execute data synchronization, the data synchronization is executed by setting a data read-lock to the data queue of the selected message broker sequentially, to allow data contents in the buffer queues of all of the plurality of message brokers to be written into the data queue of the selected message broker, and the complete data contents in the data queue of the selected message broker are copied to the data queues of the other message brokers, to allow the data contents in the data queues of each of the message brokers to be consistent.

According to a system and a method for synchronizing publication and subscription of message queues according to the present disclosure, message brokers of data message transmission and access of a message publisher or a message subscriber are not limited, and both client ends can select any one of the message brokers relating a topic to publish or subscribe data messages, to achieve the overall high data transmission parallelism and throughput. The message brokers comprise two kinds of message queues, i.e., buffer queues and data queues, which are used by a publisher to transmit data and used by a subscriber to access data, respectively. Therefore, as any one of the message brokers requests a synchronization requirement, the old messages can still be published continuously, and the problem that the transmission throughput is reduced whenever the message brokers are synchronizing data is solved.

BRIEF DESCRIPTION OF DRAWINGS

The disclosure can be more fully understood by reading the following detailed description of the embodiments, with reference made to the accompanying drawings, wherein:

FIG. 2 is a flow chart of a method for synchronizing publication and subscription of message queues of an embodiment according to the present disclosure;

DETAILED DESCRIPTION OF DISCLOSED EMBODIMENTS

Figure 1:
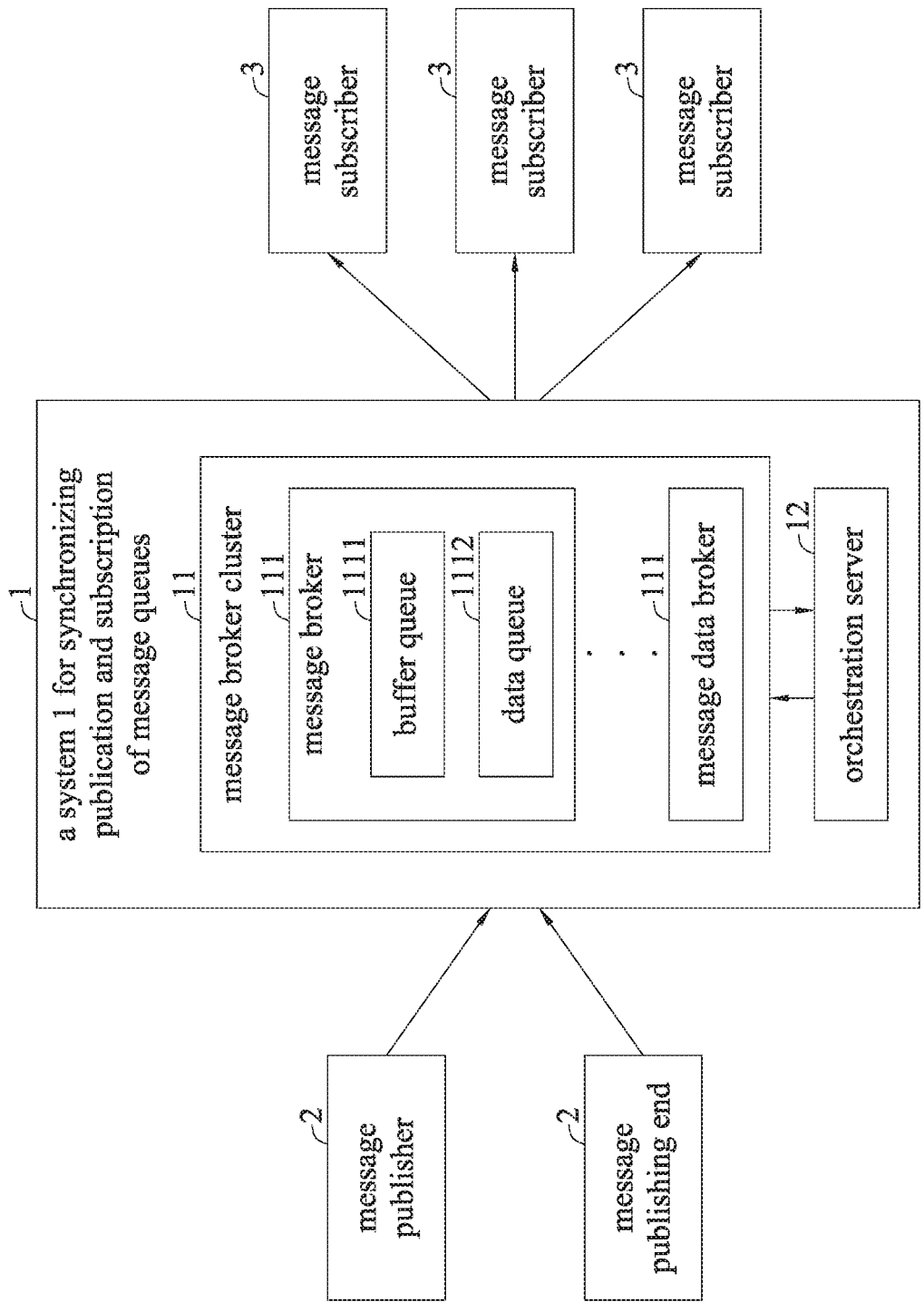
FIG. 1 is an architecture of a system for synchronizing publication and subscription of message queues of an embodiment according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The exemplary embodiments according to the present disclosure may include one or more novel features described in the specification (including those described in the embodiments) and/or illustrated in the drawings. As used in the context, "at least one," "one or more" and "and/or" are open expressions that mean both being connected and being separated in operations. For instance, each of the expressions "at least one of A, B and C," "at least one of A, B or C," "one or at least one of A, B and C," "one or at least one of A, B or C" and "A, B and/or C" means a single A, a single B, a single C, A and B together, A and C together, B and C together, and A, B and C together.

Note that the term "an" entity indicates one or more the above-described entities. Therefore, the terms "one or more" and "at least one" are interchangeable in the context.

FIG. 1 is an architectural diagram of a system 1 for synchronizing publication and subscription of message queues of an embodiment according to the present disclosure. The system 1 for synchronizing publication and subscription of message queues allows data contents of message broker therein to be consistent, and allows a message subscriber 3 to obtain data that it needs. The system 1 for synchronizing publication and subscription of message queues comprises a message broker cluster 11 and an orchestration server 12.

The message broker cluster 11 comprises a plurality of message brokers 111. Each of the message brokers 111 comprises two types of message queues, i.e., a buffer queue 1111 and a data queue 1112. The message brokers 111 are categorized into groups based on topics, i.e., the message broker cluster 11, in order to distribute (parallelize) publishing and subscribing received data.

The orchestration server 12 is connected to the message broker cluster 11. As one of the message brokers 111 in the message broker cluster 11 requests a synchronization requirement, the orchestration server 12 selects one of the message brokers 111 in the message broker cluster 11 to perform data synchronization. The data synchronization is performed by setting a data read-lock, to allow the data contents in the buffer queues 1111 of the message brokers 111 to be written into the data queue 1112 of the selected message broker 111 sequentially, and copying the data contents in the data queue 1112 of the selected message broker 111 to the data queues 1112 of the other message brokers 111 to allow the data contents in the data queue 1112 of each of the message brokers 111 to be consistent.

In an embodiment, the orchestration server 12 is in charge of control tasks, such as message topic management, fail over among data brokers and flush data to disk for permanent storage, sets a data read-lock of data synchronization, and executes and manages the synchronization tasks among the data queues 1112 of the message brokers 111.

In an embodiment, the orchestration server 12 synchronizes data contents in two ways. The first one is that the orchestration server 12 writes the data contents in the buffer queues 1111 of all of the message brokers 111 into the data queue 1112 of the selected message broker 111 sequentially based on time when the data contents in the buffer queues 1111 among all of the message brokers 111 are generated and sequence identification numbers (seq. id). The second one is that the orchestration server 12 writes the data contents in the buffer queues 1111 of all of the message brokers 111 batch by batch into the data queue 1112 of the selected message broker 111 sequentially in the unit of time periods based on an order of each of the message brokers 111 batch by batch synchronously.

It is known from the above that the orchestration server 12, when performing the data synchronization among the message brokers 111, the synchronization actuation timing points that can be according to the time period or the message subscriber access the data contents in the data queues 1112 to the ends. The message brokers 111 issue a data synchronization requirement of the data queues 1112 to the orchestration server 12, and the orchestration server 12 selects one message broker 111 to perform the data synchronization, and sets data read synchronization lock to lock the data queue 1112 of the selected message broker 111, to avoid that data is accessed by the message subscriber 3 during the synchronization process.

The message publisher 2 connects the message broker cluster 11. The message publisher 2 selects any message broker 111 related to a topic based on a transmission state to publish messages. The message broker 111 selected by the message publisher 2, after receiving the data messages published by the message publisher 2, adds the data messages to the end of the buffer queue 1111 of the message broker 111 selected by the message publisher 2. The transmission state comprises a network state, a distance and broker response time.

The message subscriber 3 connects the message broker cluster 11. The message subscriber 3 selects any message broker 111 related to a topic to subscribe messages based on a transmission state. The message broker 111 selected by the message subscriber 3, after receiving the data access issued by the message subscriber 3, transmits the data contents in the data queue 1112 of the message broker 111 selected by the message subscriber 3 sequentially, and records the reading position of the message subscriber 3, for the message subscriber 3 to keep reading the data contents in the selected message broker 111 thereafter.

FIG. 2 is a flow chart of a method for synchronizing publication and subscription of message queues of an embodiment according to the present disclosure. The method for synchronizing publication and subscription of message queues primarily states that each of the message brokers in the message broker cluster may be stored with different data contents, and the synchronization will be requested when any one of the message brokers cannot provide the message subscriber to obtain data contents, then the data contents of each of the message brokers are consistent, in order to achieve the objective of high transmission throughput of message data and parallel access.

In step S21, a message broker cluster is provided. The message broker cluster comprises a plurality of message brokers having buffer queues and data queues. In order to have high transmission throughput of message data, the design of a plurality of message brokers is employed. Each of the message brokers has a buffer queue that receives newly coming data contents and a data queue for a subscriber to read the data contents. Based on the use of the buffer queues and the data queues, the data transmission throughput is not affected while the synchronization of message data is executed, in order to achieve the objective of message data access parallelism.

In step S22, as any one of the message brokers in the message broker cluster requests a synchronization requirement, an orchestration server selects one of the message brokers in the message broker cluster to perform data synchronization. In step S22, a subscriber usually selects a message broker to read data contents, but the complete data contents may be distributed to a plurality of different message brokers. Therefore, as any one of the message brokers may not meet the subscriber's demand, i.e., when the subscriber cannot obtain data contents, the message brokers request a synchronization requirement, to allow the orchestration server to assign a message broker to perform the data synchronization.

In step S23, a data read-lock is set to the data queue of the selected message broker sequentially, and the data contents in the buffer queues of all of the message brokers are written into the data queue of the selected message broker. In step S23, the reading of the data queue of the message broker assigned/selected by the orchestration server will be locked first, then the data contents in the buffer queues of all of the plurality of message brokers are written into the data queue of the selected message broker, and then the data queue of the selected message broker has all data contents.

In step S24, the complete data contents in the data queue of the selected message broker are copied to the data queues of the other message brokers, allowing the data contents in the data queue of each of the message brokers to be consistent. In step S24, the complete data contents contained in the data queue of the selected message broker are copied to the data queues of the other message brokers that are not selected. Therefore, the data contents in the data queues of all of the message brokers are consistent.

In an embodiment, in the previously described synchronization mechanism the data contents in the buffer queues of all of the message brokers are written into the data queue of the selected message broker sequentially in two ways. The first way is that data contents are written sequentially based on the time when the data contents in the buffer queues are generated and the sequence identification numbers (seq. id). The first way is based on that the data contents in each of the buffer queues have their generation time or the sequence identification numbers (i.e., an order). Therefore, the data contents can be written into the data queue of the selected message broker sequentially based on the order that the data contents in each of the buffer queues are generated.

The second way is that the orchestration server writes the data contents in the buffer queues of each of the message brokers batch by batch into the data queue of the selected the message broker subsequently in the unit of time periods based on an order of each of the message brokers batch by batch synchronously. The second way locks the data queue of the selected message broker through a time period (e.g., 10 seconds or one minute), acquires all data contents in the buffer queues of the other message brokers, and writes the data contents into the data queue of the selected message broker.

In an embodiment, the order of each of the message brokers may be performed by a ring, a star or other network topology structures, and all data contents in the buffer queue of each message broker are written batch by batch into the data queue of the selected message broker.

The above two ways differ in that the orders of the data contents in the data queue of the selected message broker may be different, but the data accessed contents are the same. The orders could be different is that the first way takes the generation time or sequence identification number of each data content in each buffer queue into consideration. For instance, the first buffer queue may have data contents NOs. 1, 3 and 4, the second buffer queue may have data contents NOs. 2 and 5, and all data contents are written into the data queue of the selected message broker will follow the order 1, 2, 3, 4, and 5. If the second way is employed, all data contents (NOs. 1, 3 and 4) of a buffer queue are all obtained, and then all data contents (NOs. 2 and 5) of a next buffer queue are obtained. Therefore, all the data accessed contents are stored in the data queue of the selected message broker will follow the order 1, 3, 4, 2 and 5. After all, all data contents will be stored in the data queue of the selected message broker, and the data queues of each of the message brokers are consistent.

The previously-described buffer queues allow a message publisher to add its data contents to the end of the buffer queues sequentially. Simply put, when the message publisher publishes new data contents, the data contents will select a message broker relating a topic to publish messages based on a network state, a distance to brokers and a transmission state of broker response time, allowing the new data contents to be written into the end of the buffer queue of the selected message broker.

Similarly, the previously-described data queues transmit the data contents in the data queues based on the data access of the message subscriber (i.e., the previously-described subscriber) sequentially and record the reading position of the message subscriber. Similarly, the message subscriber selects the message broker relating a topic to subscribe the messages based on a network state, a distance to broker and a transmission state of broker response time. In other words, if the message subscriber requests a data access requirement, the data queue of the selected message broker can obtain the needed data contents, and the reading position of the message subscriber will be recorded synchronously, for the data to be kept read subsequently.

Figure 3A:
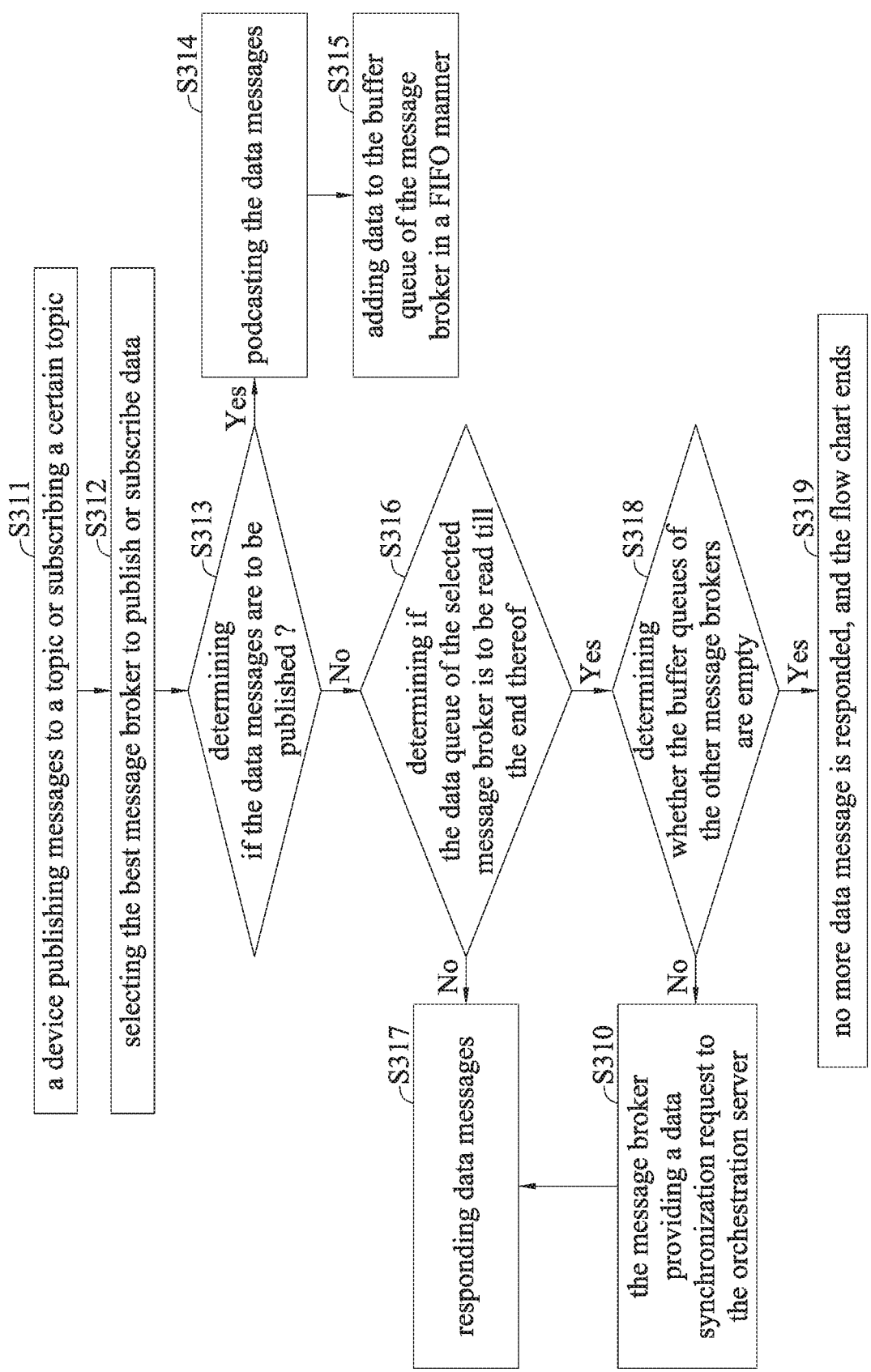
FIGS. 3A-3C are flow charts illustrating how message queues are published and subscribed according to the present disclosure.
Figure 3B:
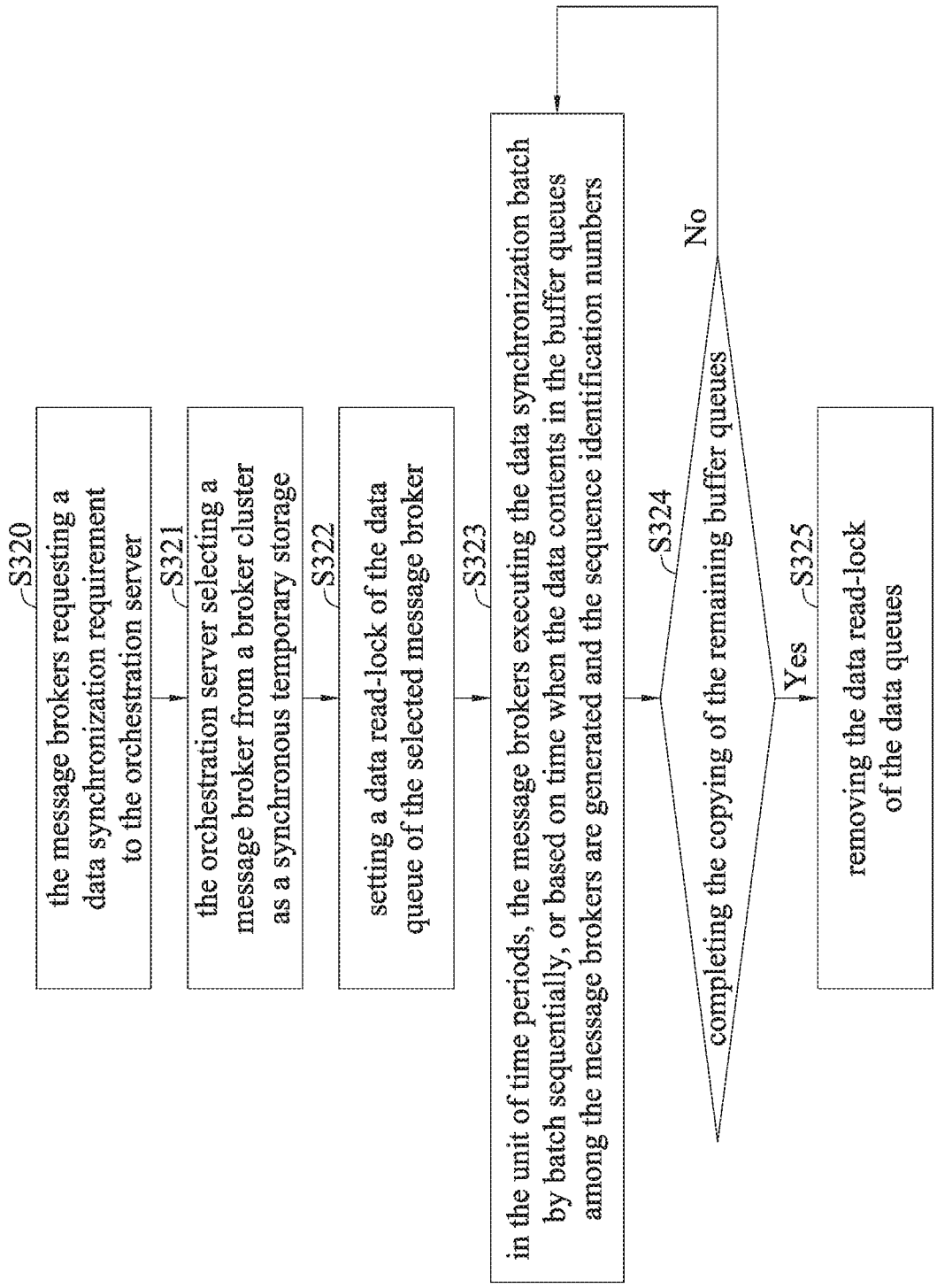
Figure 3C:
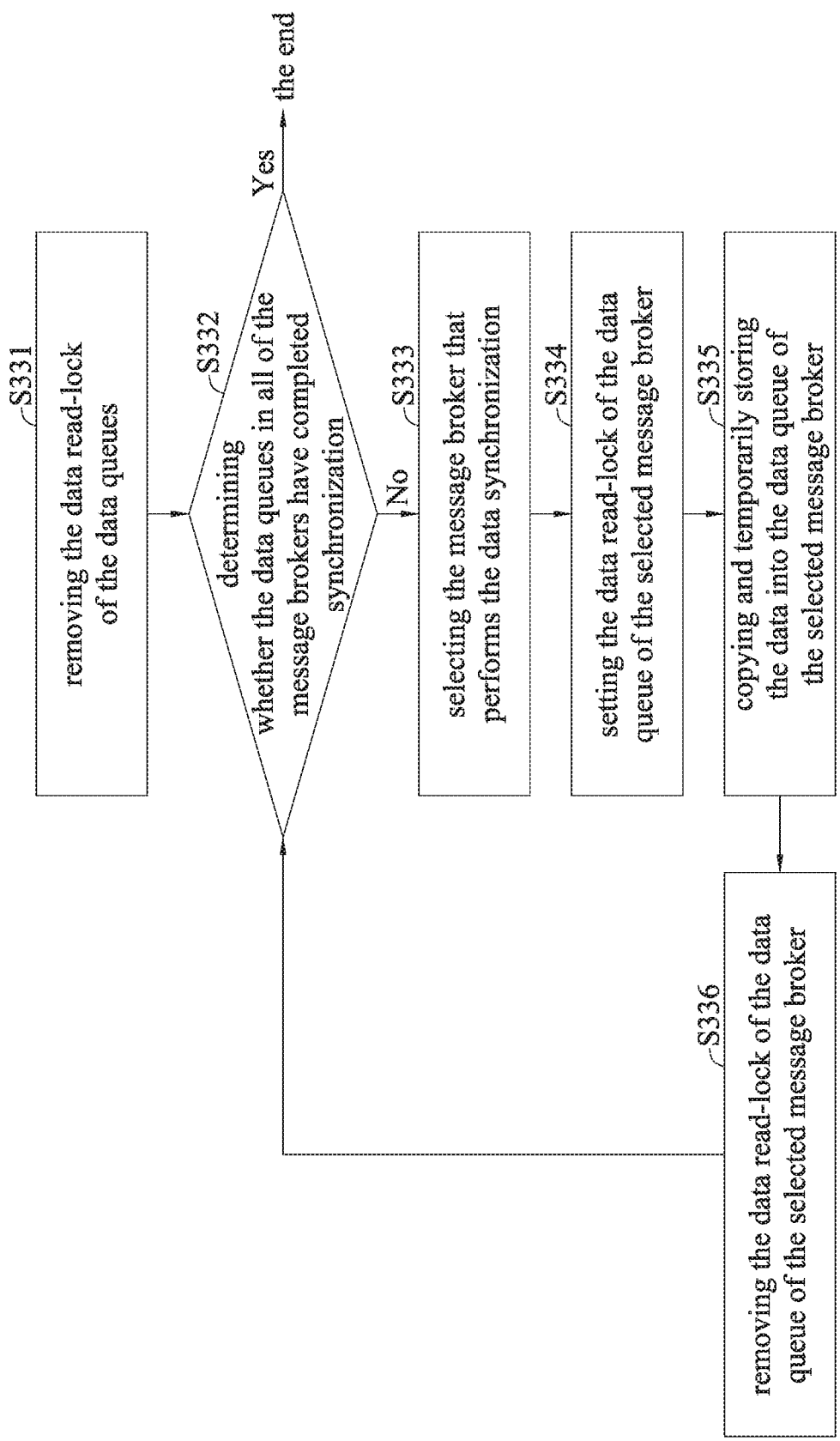

FIGS. 3A-3C are flow charts illustrating how message queues are published and subscribed according to the present disclosure. FIG. 3A shows that the message publisher or the message subscriber issues a message requesting publishing or subscribing data. In steps S311 and S312, a device (a message publisher or a message subscriber) tries to publish messages to a topic or subscribe a certain topic. The message publisher publishes messages to a message broker of a certain topic, or the message subscriber subscribes data contents in the message broker in a certain topic. Then the message publisher or the message subscriber will select the best message broker to publish or subscribe data.

In steps S313-S315, the data messages are determined if they are to be published; if so, in step S314 the data messages are podcast, and step S315 is executed, in which data are added to the buffer queue of the message broker in a FIFO manner.

On the contrary, if the data messages are not to be published, but to be read instead, step S316 is executed, in which if the data queue of the selected message broker is to be read till the end thereof is determined. If not so, step S317 is executed, indicating that the selected message broker can still provide the data contents that the message subscriber needs. If the selected message broker has no data content that the message subscriber needs, step S318 is executed, in which whether the buffer queues of the other message brokers are empty is determined. If so, step S319 is executed, in which no more data message is responded, and the flow chart ends.

In step S318, if it is found that the buffer queues of the other message brokers are not empty, which indicates that some data are not put into the data queues and thus cannot be read, step S310 is executed, in which the message broker provides a data synchronization request to the orchestration server. After synchronization, step S317 is executed, responding data messages.

FIG. 3B describes a front process of the data synchronization, and corresponds to steps S22 and S23 of FIG. 2. In step S320, the message brokers request a data synchronization requirement to the orchestration server. In steps S321 and S322, the orchestration server selects a message broker from a broker cluster to register the data synchronization, and sets a data read-lock of the data queue of the selected message broker, to avoid someone from executing reading during synchronization.

In step S323, in the unit of time periods, the message brokers execute the data synchronization batch by batch sequentially, or based on time when the data contents in the buffer queues among the message brokers are generated and the sequence identification numbers. Then, step S324 is executed, in which the copying of the remaining buffer queues is completed. Lastly, step S325 is executed, in which the data read-lock of the data queues is removed.

FIG. 3C describes the rear process of the data synchronization, and corresponds to step S24 of FIG. 2. In step S331, the data read-lock of the data queues is removed, and step S332 is executed, in which whether the data queues in all of the message brokers have completed synchronization is determined. If so, which indicates that the synchronization of the message brokers in the same topic is completed, the synchronization process ends. If not so, step S333 is executed.

In steps S333-S336, first, the message broker that performs the data synchronization is selected. Then, the data read-lock of the data queue of the selected message broker is set. Thereafter, the data is copied and temporary stored into the data queue of the selected message broker. In other words, the data contents in the data queue of the message broker, that is taken as a synchronous temporary storage, are copied to the message broker(s) that are not synchronized. Lastly, the data read-lock of the data queue of the selected message broker is removed, and step S332 is executed, until the data contents in the data queues of all of the message brokers are consistent and the entire synchronization process ends.

Figure 4A:
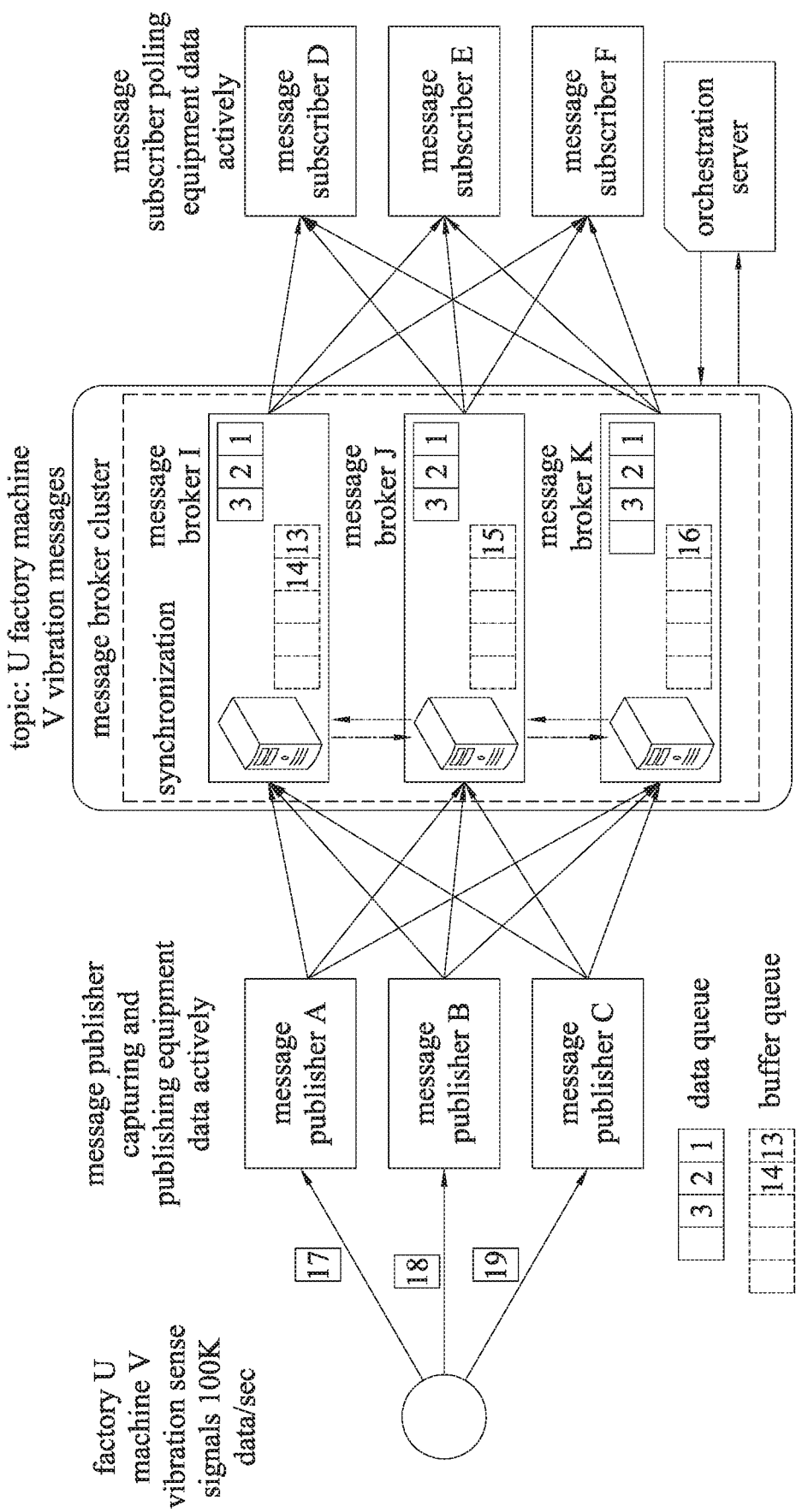
FIGS. 4A-4G are schematic diagrams of a synchronization mechanism of a method for publishing and subscribing message queues according to the present disclosure.

FIGS. 4A-4G are schematic diagrams of a synchronization mechanism of a method for publishing and subscribing message queues according to the present disclosure. FIG. 4A describes an embodiment of a technical concept that the present disclosure employs. Vibration signals of a machine V of a factory U are collected. Signals can be generated at 100 Khz every second. A plurality of message publishers A-C are used to publish data, and a plurality of message subscribers D-F are used to subscribe data. For instance, the machine V of the factory U generates data contents NOs. 17-19, which can be sent to the message publishers A-C randomly or based on a rule. The plurality of message publishers A-C can select a message broker to publish data based on a transmission state. In an embodiment, the message broker cluster includes three message brokers I, J and K. As shown in the drawings, the data content no. 18 is sent to the message publisher B, and the message publisher B selects a message broker based on a transmission state to send the data content no. 18. In other words, each of the message brokers I, J and K may be stored with different data contents. For instance, the buffer queue of the message broker I has the data contents 13 and 14, the buffer queue of the message broker J has the data content no. 15, and the buffer queue of the message broker K has the data content no. 16. Data in the buffer queues cannot be read, and only the data queues (having data contents NOs. 1-3 currently) can be subscribed and read. Therefore, the plurality of message subscribers D-F can perform polling and select one of the message brokers I, J and K to subscribe and read data contents based on a transmission state. Therefore, the message brokers that the message publisher or the message subscriber uses to transmit and access data messages are not limited, and the client end can select any message broker relating a topic, in order to achieve the overall data transmission parallelism and high throughput.

However, in the above states, there may be one message subscriber that cannot obtain the data that it needs from the message broker that it selects. For instance, the current three message brokers I, J and K cannot obtain the data contents NOs. 17-19, and when the message subscribers D-F are not satisfied, the accessed message brokers request a synchronization requirement. The data contents can be written into the data queues of the message brokers in two ways. The first way is employing the time and sequence of the data contents in the buffer queues among the message brokers. The data contents are written into the data queue of the selected message broker based on time when the data contents in each buffer queue are generated and the sequence identification numbers. The second way is based on the order batch of the message brokers. All message brokers write data contents in the buffer queues batch by batch into the data queue of the selected message broker. The data contents in all buffer queues are written at one time. The difference between these two ways are represented by FIGS. 4B-4D and FIGS. 4E-4G.

Figure 4B:
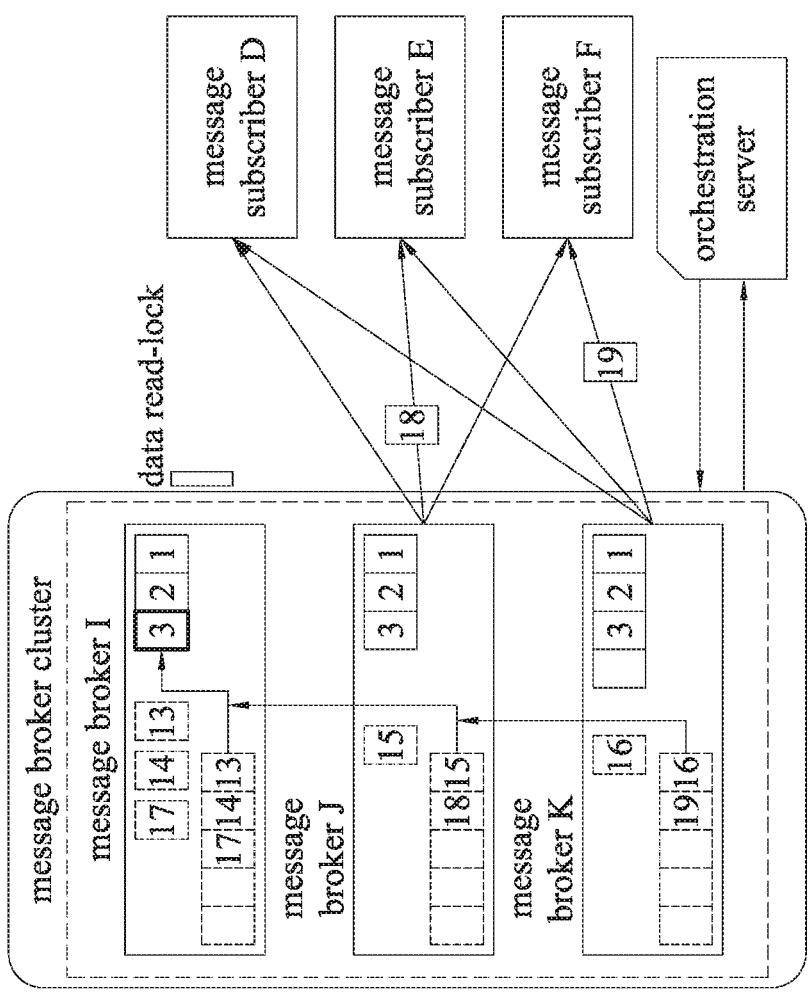
Figure 4C:
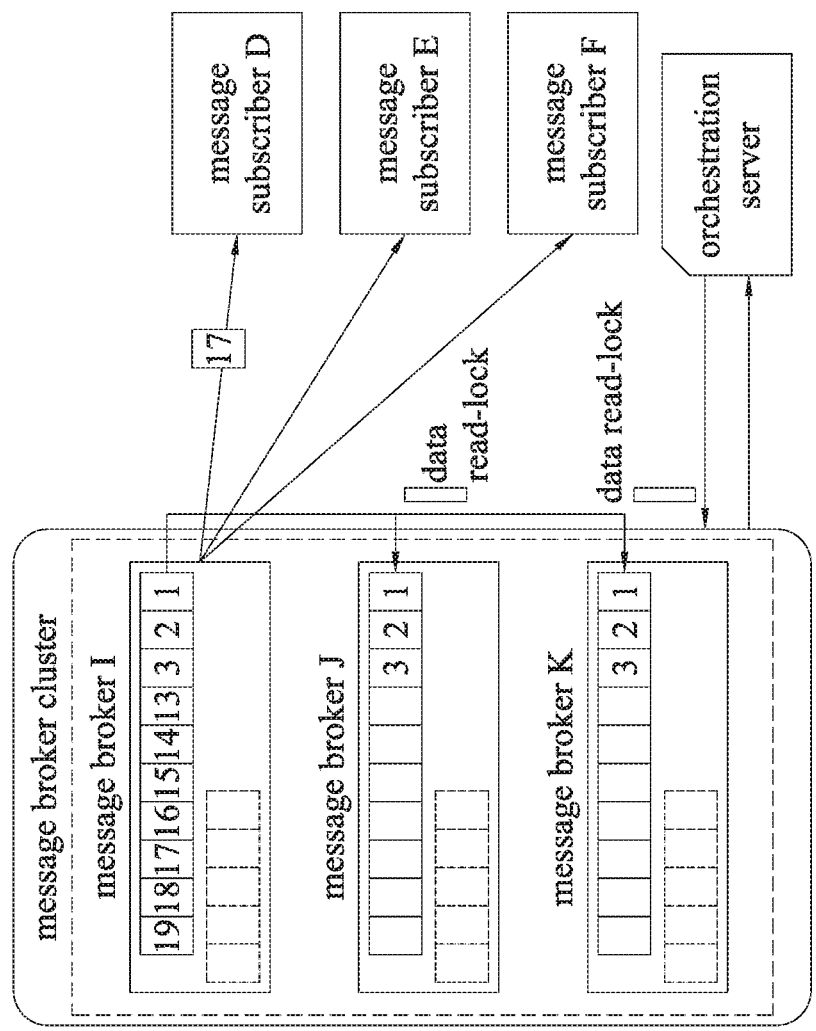
Figure 4D:
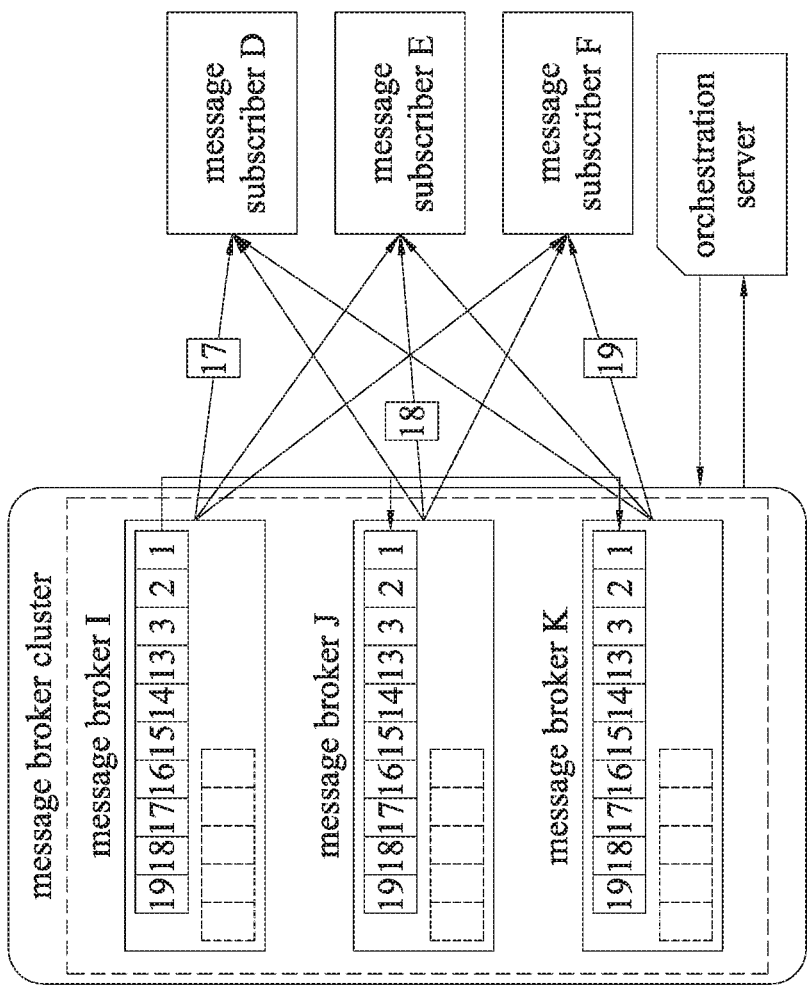

FIGS. 4B-4D show the first data content synchronization mechanism. As shown in the drawings, the data queues of the three message brokers I, J and K all have the data contents NOs. 1-3, which indicates that data stored in the data queues have been synchronized. The message subscribers D-F can read the data contents in the data queues only.

The buffer queues of the three message brokers are stored with different data contents. In an example, after the data contents NOs. 17-19 are stored in the message brokers I, J and K, the data contents NOs. 13, 14 and 17 are stored in the buffer queue of the message broker I, the data contents NOs. 15 and 18 are stored in the buffer queue of the message broker J, and the data contents NOs. 16 and 19 are stored in the buffer queue of the message broker K. When the message subscribers D-F cannot obtain the data contents except NOs. 1-3 from any one of the message brokers I-K, the message brokers I-K have to be synchronized.

In the beginning, after any one of the message brokers I-K requests a synchronization requirement, the orchestration server will select one of the message brokers to act as synchronous temporary storage. For instance, when the message broker I is selected, the data queue of the message broker I will be data read-locked, to avoid the data queue from being read during the synchronization process. Then, the data contents in the buffer queues of the message brokers I-K are all written into the data queue of the message broker I. In other words, the data contents NOs. 13, 14, 17, 15, 18, 16 and 19 are also added to the data queue of the message broker I, in addition to the original data contents NOs. 1-3.

This embodiment employs time and sequence of the data contents in the buffer queues among the message brokers, and the data contents are written into the data queue of the selected message broker in an order based on time when the data contents in each buffer queue are generated and sequence identification numbers. The data queue of the message broker I is data read-locked, and then the data contents are acquired in an order based on the sequence numbers of the data contents in the buffer queues of the three message brokers I-K. By comparing the sequence numbers of the data contents in the three buffer queues, the data content has a smaller sequence number will be acquired earlier. The first one is the data content no. 13 of the message broker I, the next one is the data content no. 14 of the message broker I, and the further next one is the data content no. 15 of the message broker J. Finally, the data queue of the message broker I will contain the data contents NOs. 1, 2, 3, 13, 14, 15, 16, 17, 18 and 19.

Next, as shown in FIG. 4C, the data queue of the message broker I has contained all the data contents. Then, the data read-lock of the message broker I is released, and the message brokers J and K are data read-locked, to copy the data contents in the data queue of the message broker I to the message brokers J and K, to complete the synchronization process. The message brokers can be data read-locked one by one. Finally, as shown in FIG. 4D, the data contents in the data queues of the message brokers I, J and K are the same. The message subscribers D-F can obtain the data contents that they need from any one of the message brokers I, J and K.

Figure 4E:
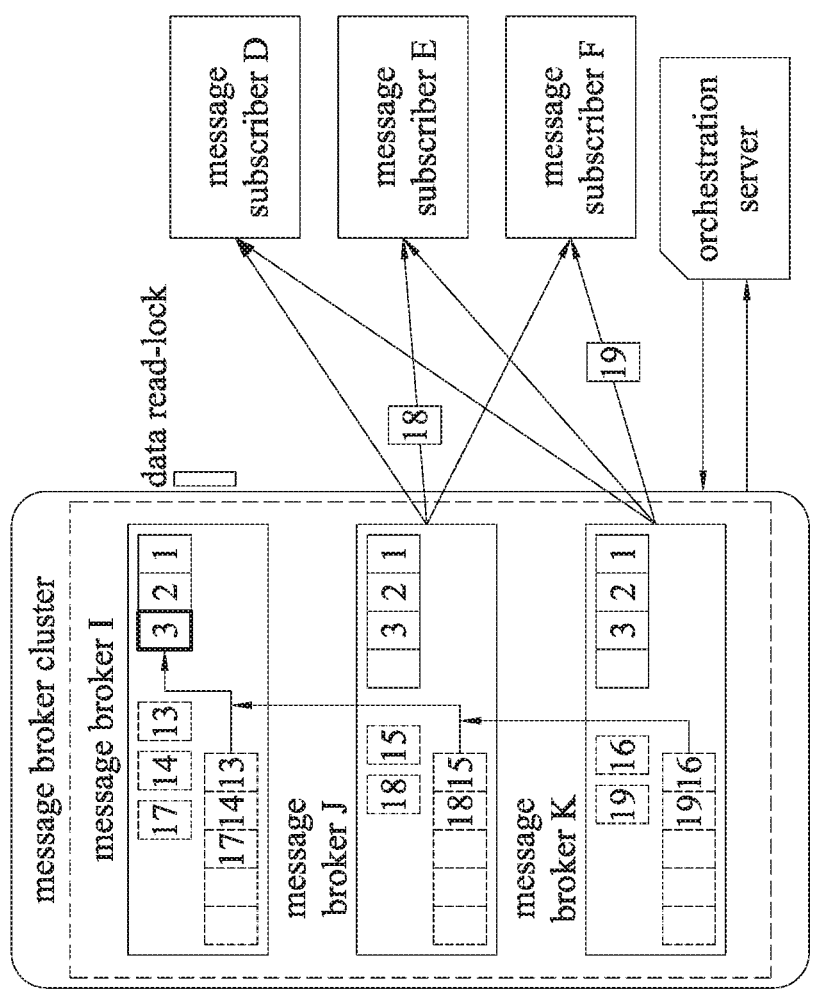
Figure 4F:
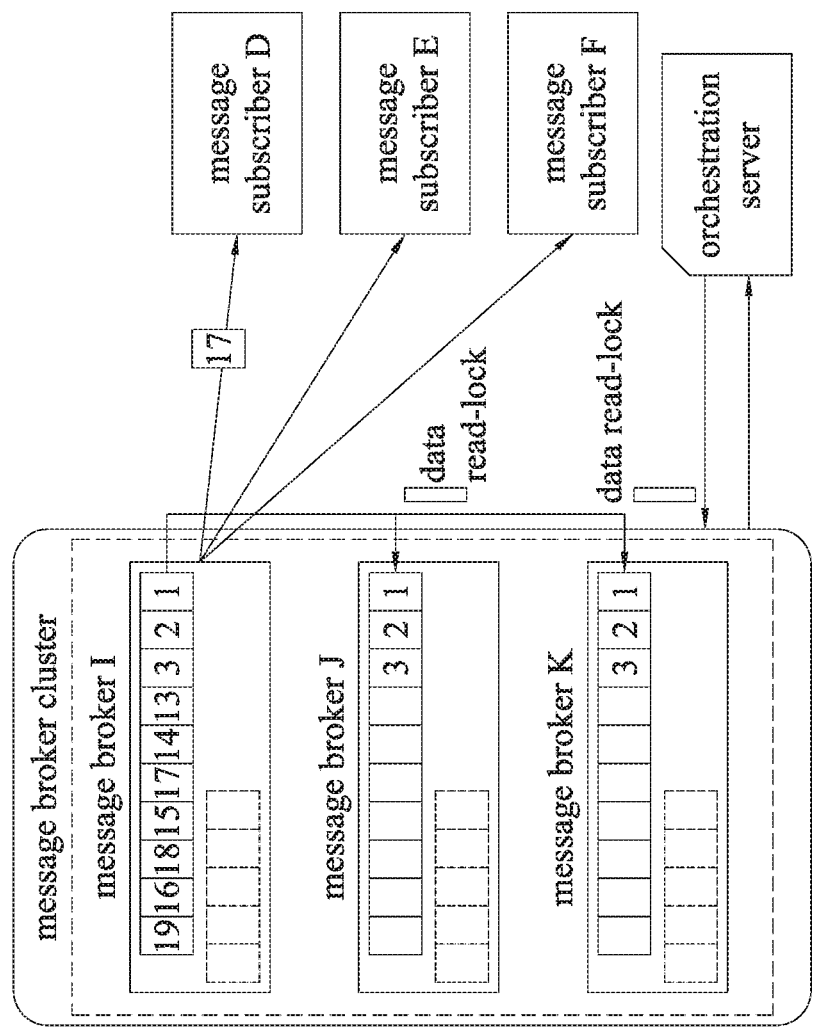
Figure 4G:
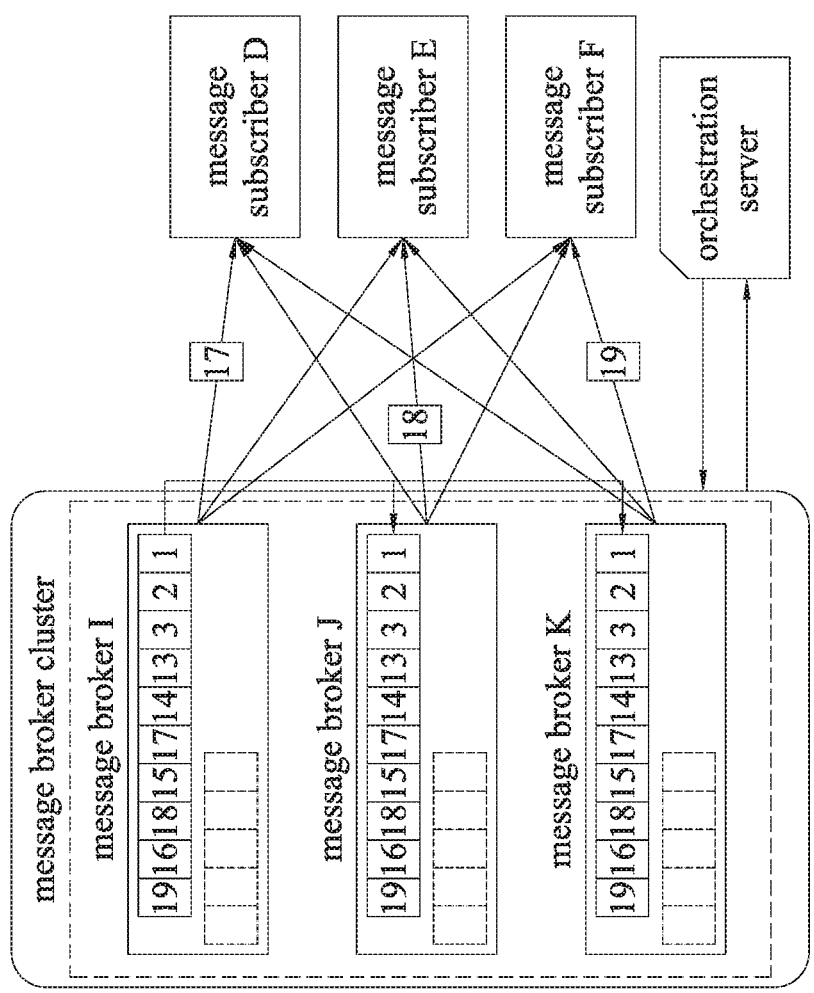

FIGS. 4E-4G illustrate the second data content synchronization mechanism according to the present disclosure, in which all the message brokers write the data contents of the buffer queues batch by batch into the data queue of the message broker I based on the order batch of the message brokers, i.e., writing all the data contents in the buffer queues at one time.

As shown in FIG. 4E, the data queue of the message broker I is data read-locked, and the three message brokers I-K write the data contents of buffer queues into the data queue of the message broker I in any order in a manner, such as a ring, a star or other distributed network topology structures, without regard to the order in which the data contents are generated. For instance, data are copied based on the order of the message brokers I-K, that is, the message broker I writing NOs. 13, 14 and 17 into the data queue of the message broker I at one time, and then the message broker J, and so on.

Finally, as shown in FIG. 4F, the data queue of the message broker I has contained all the data contents, i.e., the data contents NOs. 1, 2, 3, 13, 14, 17, 15, 18, 16 and 19. Then, the data read-lock of the message broker I is released, and the message brokers J and K are data read-locked. Thereafter, the data contents in the data queue of the message broker I are copied to the other message brokers J and K, and the synchronization process is complete. Finally, as shown in FIG. 4G, the data contents in the data queues of the message brokers I, J and K are the same. The message subscribers D-F can obtain the data contents that they need from any one of the message brokers I, J and K.

Figure 5A:
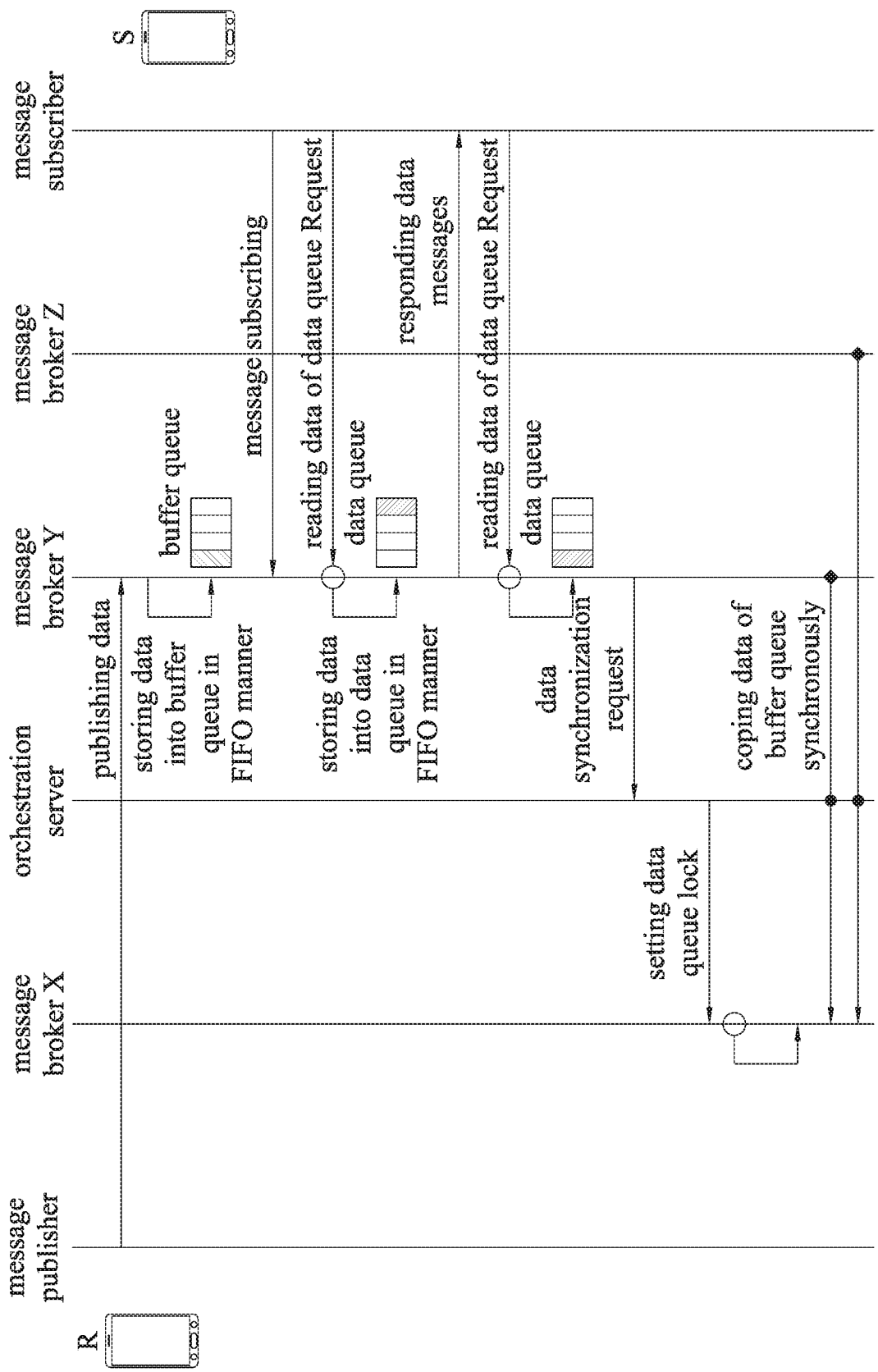
FIGS. 5A-5D are sequence diagrams of a synchronization mechanism of a method for publishing and subscribing message queues according to the present disclosure.

FIGS. 5A-5D are sequence diagrams of a synchronization mechanism of a method for publishing and subscribing message queues according to the present disclosure. As shown in FIG. 5A, the message publisher has a device R, the message subscriber has a device S, and the device R selects any one of the message brokers to publish data, for example, by publishing data to a message broker Y. The data is stored in the buffer queue in FIFO manner. The device S also selects any one of the message brokers to subscribe and read, for example, subscribing the message broker Y and sending a data reading request.

The data are read by the data queue in FIFO manner. Then, the device S obtains the data messages from the message broker Y.

If the device S keeps reading the data queue of the message broker Y until the end, but still cannot obtain the data contents that it needs, the message broker Y will request the orchestration server for the data synchronization. Then, the orchestration server will select a message broker to act as a data synchronous temporary storage. As shown in the drawings, the orchestration server selects the message broker X. Then, the orchestration server will put data read-lock on the data queue of the message broker X, and copy the data contents in the buffer queues of the message brokers X, Y and Z into the data queue of the message broker X.

Figure 5B:
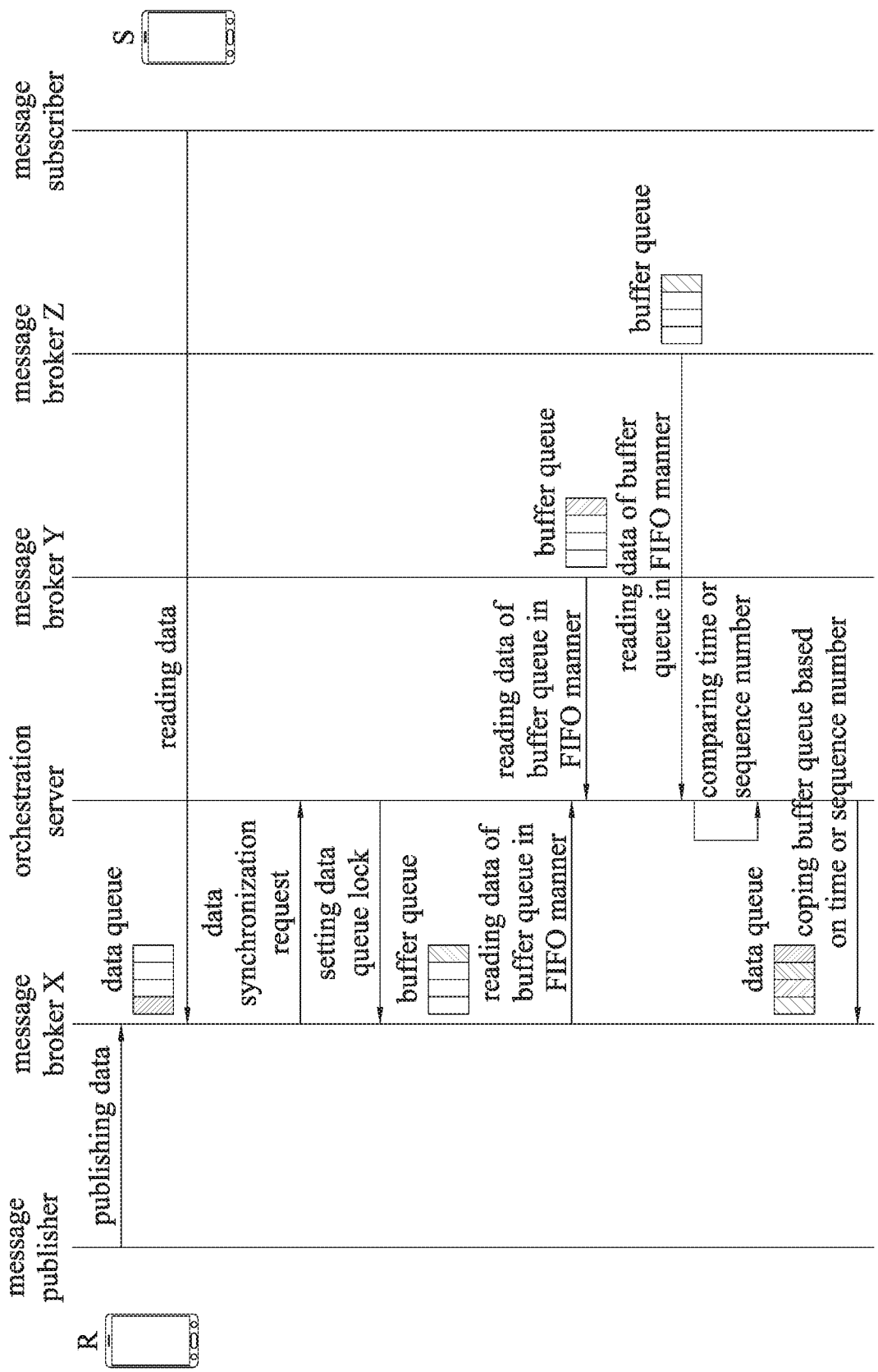
Figure 5C:
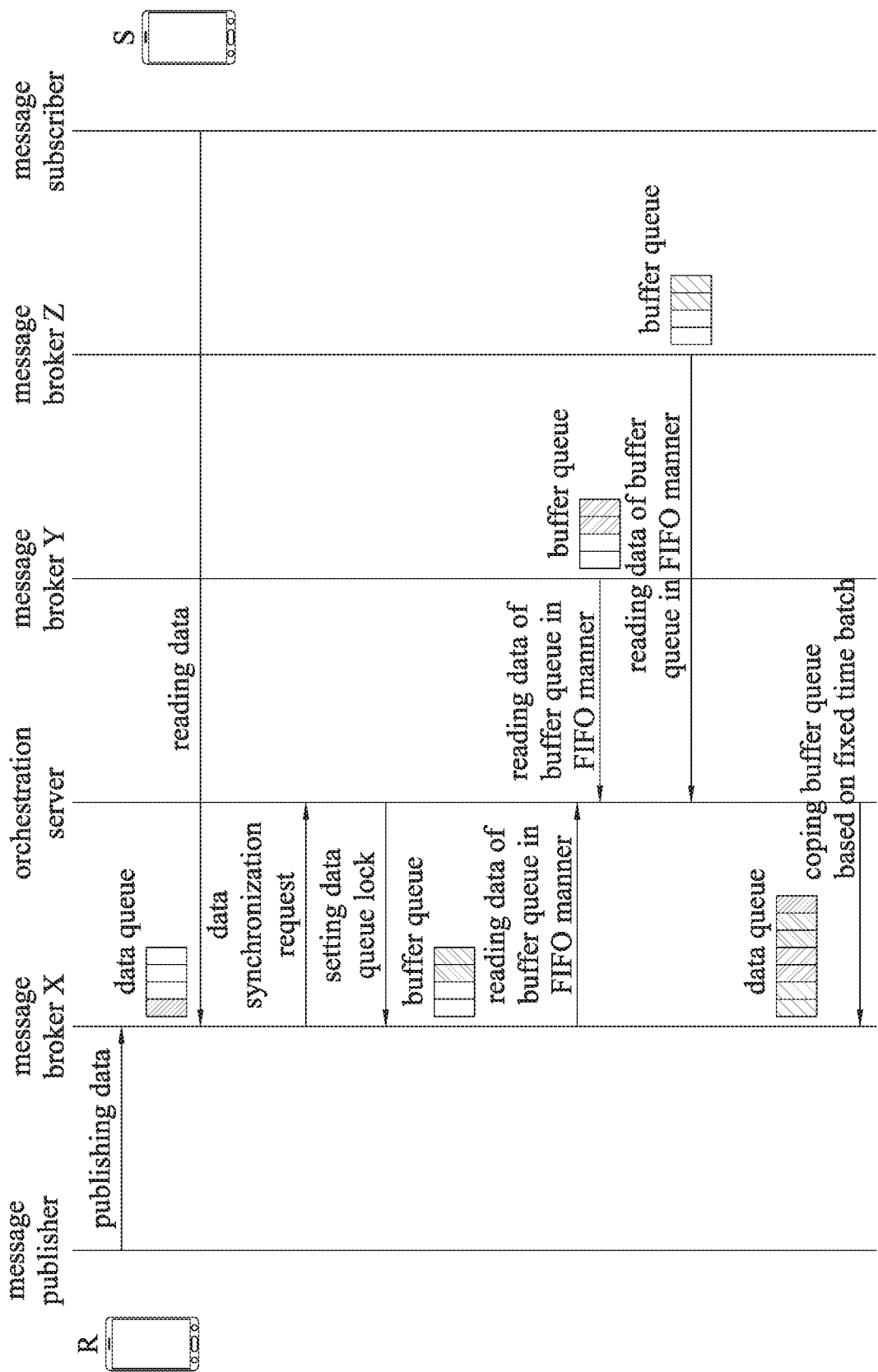

FIGS. 5B and 5C show the sequence diagrams of data synchronization that is performed based on the time and sequence of the data contents in the buffer queues among the message brokers and based on the order batch of the message brokers, respectively.

As shown in FIG. 5B, when the device S reads the data in the data queue of the message broker X till the end of the data queue, but still cannot obtain the data contents that it needs, the message broker X will request the orchestration server for data synchronization. Then, the orchestration server will select a message broker to act as a data synchronous temporary storage. As shown in the drawings, the orchestration server selects the message broker X. Then, the orchestration server will put data read-lock on the data queue of the message broker X, read the data contents in the buffer queues of the message brokers X, Y and Z in FIFO manner, then compare the time or sequence numbers of the data contents to know the order of the data contents, and, finally, copy all the data contents to the data queue of the message broker X.

As shown in FIG. 5C, the device S also cannot acquire data from the message broker X. The message broker X will request the orchestration server for data synchronization. Then, the orchestration server will select a message broker to act as a data synchronous temporary storage. As shown in the drawings, the orchestration server selects the message broker X, then reads-lock the data queue of the message broker X, then reads the data contents in the buffer queues of the message brokers X, Y and Z in FIFO manner, copies the data contents in each buffer queue batch by batch periodically, and finally copies all the data contents to the data queue of the message broker X.

Figure 5D:
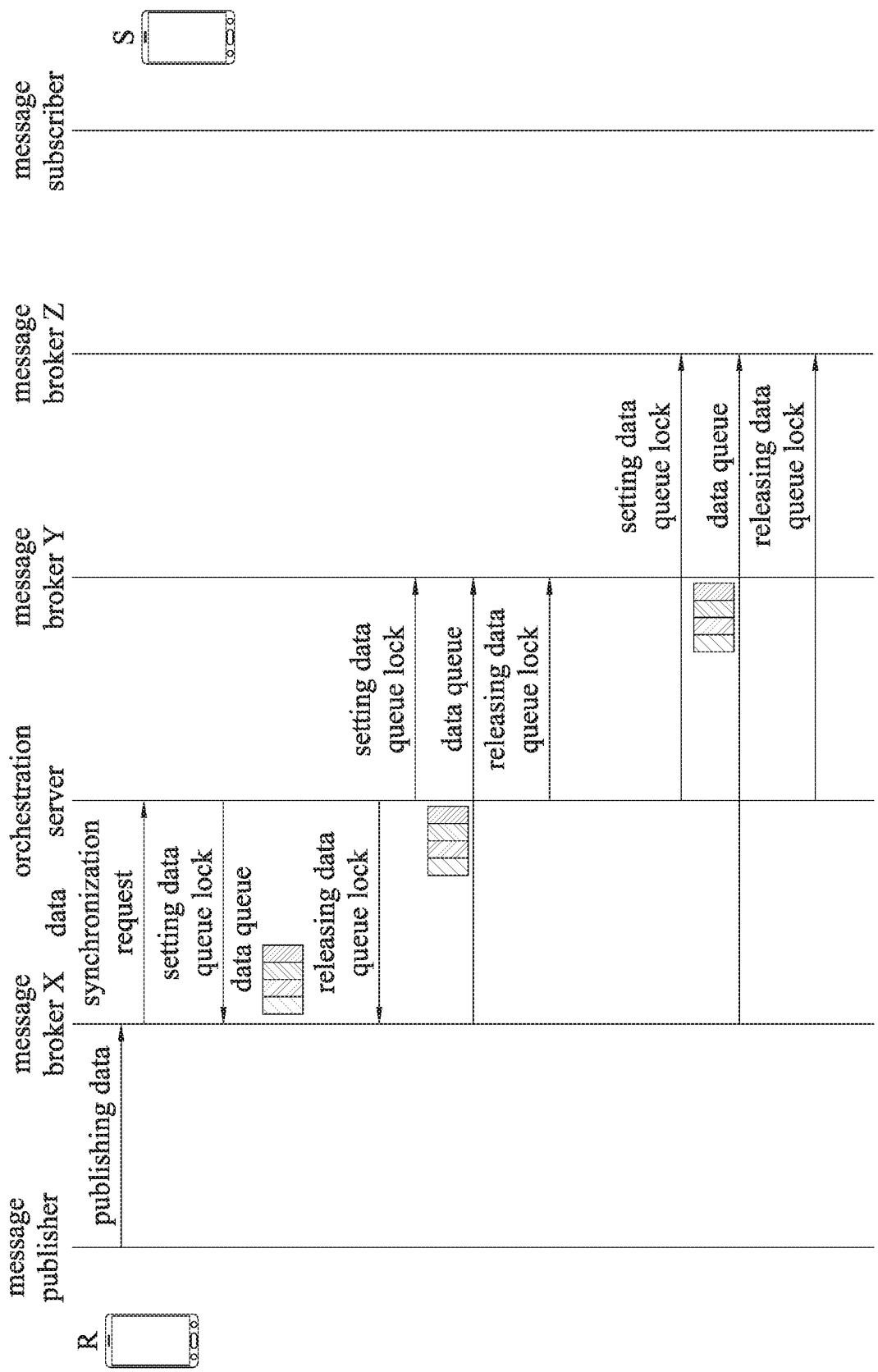

As shown in FIG. 5D, after the message broker X requests the orchestration server for the data synchronization, the data queue of the message broker X is data read-locked, and the data synchronization copying is complete, the orchestration server releases the lock of the data queue on message broker X, then sets the reads-lock on the data queues of the message brokers Y and Z, then copies the data contents in the data queue of the message broker X to the data queues of the message brokers Y and Z to allow the data contents in the data queues of the message broker X, Y and Z to be consistent, and releases the locking of the data queues of the message brokers Y and Z.

The components according to the present disclosure, such as servers, message publishers and message subscribers, include microprocessors and memory, algorithms, data, programs, etc. are stored in a memory or chips, and the microprocessor can load data or algorithms or programs from the memory for data analysis and calculation, which will not be described in detail.

In sum, a system and a method for synchronizing publication and subscription of message queues according to the present disclosure select a message broker through a message publisher or a message subscriber based on various conditions to publish and subscribe data, to achieve data transmission parallelism and high access throughput. In order to solve the problem of the data synchronization of message queues among message brokers, the present disclosure further provides that a buffer queue and a data queue are installed in a message broker, to execute the synchronous exchange of data contents among message broker clusters. The message publisher and the message subscriber are allowed to select any message broker to publish and subscribe access message data to a topic according to network state. The message publisher does not need any writing lock during the data synchronization. However, the data subscription end, when accessing synchronously, could encounter data read-locked due to the synchronization factor of the message broker. Under an environment that other message brokers when accessing data are not affected, a time-by-time, batch-by-batch synchronous way is employed, to reduce the effectiveness problem of the transmission throughput resulted from the synchronization, and improve content synchronization and transmission throughput for the data of the message queues.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for synchronizing publication and subscription of message queues, the method comprising:
providing a message broker cluster including a plurality of message brokers each having a buffer queue and a data queue, wherein the buffer queue receives newly coming data contents and data contents in the data queue are for a message subscriber to read;
as any one of the message brokers in the message broker cluster requests a synchronization requirement, selecting, by an orchestration server, one of the message brokers in the message broker cluster to perform data synchronization;
setting a data read-lock to the data queue of the selected message broker sequentially to write data contents in the buffer queues of all of the plurality of message brokers into the data queue of the selected message broker; and
copying complete data contents in the data queue of the selected message broker to the data queues of the other message brokers, allowing the data contents in the data queues of each of the message brokers to be consistent.

2. The method of claim 1, wherein the data contents in the buffer queues of all of the plurality of message brokers are written into the data queue of the selected message broker sequentially, based on time when the data contents in the buffer queues of all of the message brokers are generated and a sequence identification number of the data contents.

3. The method of claim 1, wherein the data contents in the buffer queues of all of the plurality of message brokers are written into the data queue of the selected message broker sequentially in a unit of time periods based on an order of each of the message brokers batch by batch synchronously, allowing the orchestration server to write the data contents in the buffer queue of each of the message brokers batch by batch into the data queue of the selected message broker.

4. The method of claim 3, wherein the data contents of each of the message brokers are written in the order of a Ring- or Star-distributed network topology structure manner.

5. The method of claim 1, wherein the buffer queue of each of the message brokers allows a message publisher to add its data contents to an end of the buffer queues sequentially.

6. The method of claim 5, wherein the message publisher selects the message broker relating to a topic to publish a message based on a network state, a distance to brokers and a transmission state of broker response time.

7. The method of claim 1, wherein the data queue of each of the message brokers is accessed based on data of the message subscriber, and wherein the data contents in the data queue are transmitted sequentially, and a reading position of the message subscriber is recorded.

8. The method of claim 7, wherein the message subscriber selects the message broker relating a topic to subscribe and access a message based on a network state, a distance, and a transmission state of broker response time.

9. A system for synchronizing publication and subscription of message queues, the system comprising:
a message broker cluster including a plurality of message brokers each having a buffer queue and a data queue, wherein the buffer queue receives newly coming data contents and data contents in the data queue are for a message subscriber to read; and
an orchestration server connected to the message broker cluster,
wherein as any one of the message brokers of the message broker cluster requests a synchronization requirement, the orchestration server selects one of the message brokers in the message broker cluster to execute data synchronization, and wherein the data synchronization is executed by setting a data read-lock to the data queue of the selected message broker sequentially, allowing data contents in the buffer queues of all of the plurality of message brokers to be written into the data queue of the selected message broker, and the complete data contents in the data queue of the selected message broker are copied to the data queues of the other message brokers, allowing the data contents in the data queues of each of the message brokers to be consistent.

10. The system of claim 9, wherein the orchestration server writes the data contents in the buffer queues of all of the plurality of message brokers into the data queue of the selected message broker sequentially, based on time when the data contents in the buffer queues of all of the message brokers are generated and a sequence identification number of the data contents.

11. The system of claim 9, wherein the orchestration server writes the data contents in the buffer queues of all of the plurality of message brokers batch by batch into the data queue of the selected message broker in a unit of time periods based on an order of each of the message brokers batch by batch synchronously.

12. The system of claim 9, further comprising a message publisher connected to the message broker cluster, wherein the message publisher selects the message broker relating a topic to publish a message based on a transmission state, allowing the data contents published by the message publisher to be added to an end of the buffer queue of the message broker sequentially that the message publisher selects.

13. The system of claim 9, further comprising the message subscriber connected to the message broker cluster, wherein the message subscriber selects the message broker relating a topic to subscribe and access a message based on a transmission state, allowing the message broker that the message subscriber selects to transmit the data contents in its data queue sequentially and record a reading position of the message subscriber.

* * * * *